(No Model.) 2 Sheets—Sheet 1.
G. GARCEAU.
SPOOL CLUTCH FOR PAPER MACHINES.
No. 274,483. Patented Mar. 27, 1883.
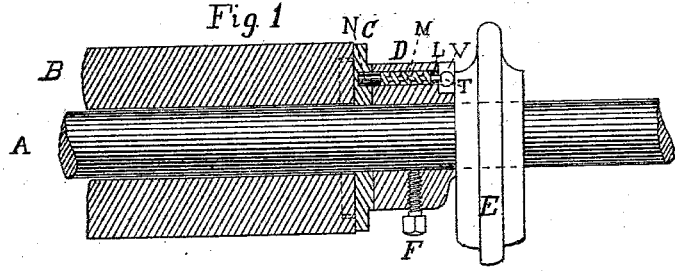
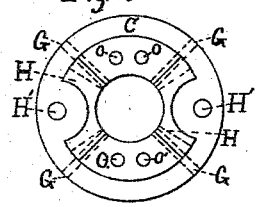
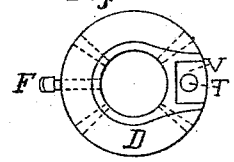
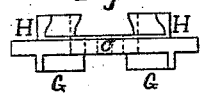
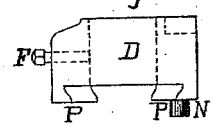
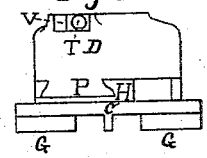
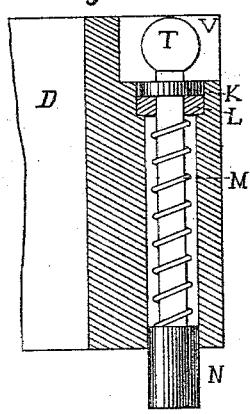
Witnesses
Inventor:
Gideon Garceau,
per H. K. Hawes, Attorney
N. PETERS, Photo-Lithographer, Washington, D. C.

(No Model.) 2 Sheets—Sheet 2.
G. GARCEAU.
SPOOL CLUTCH FOR PAPER MACHINES.
No. 274,483. Patented Mar. 27, 1883.
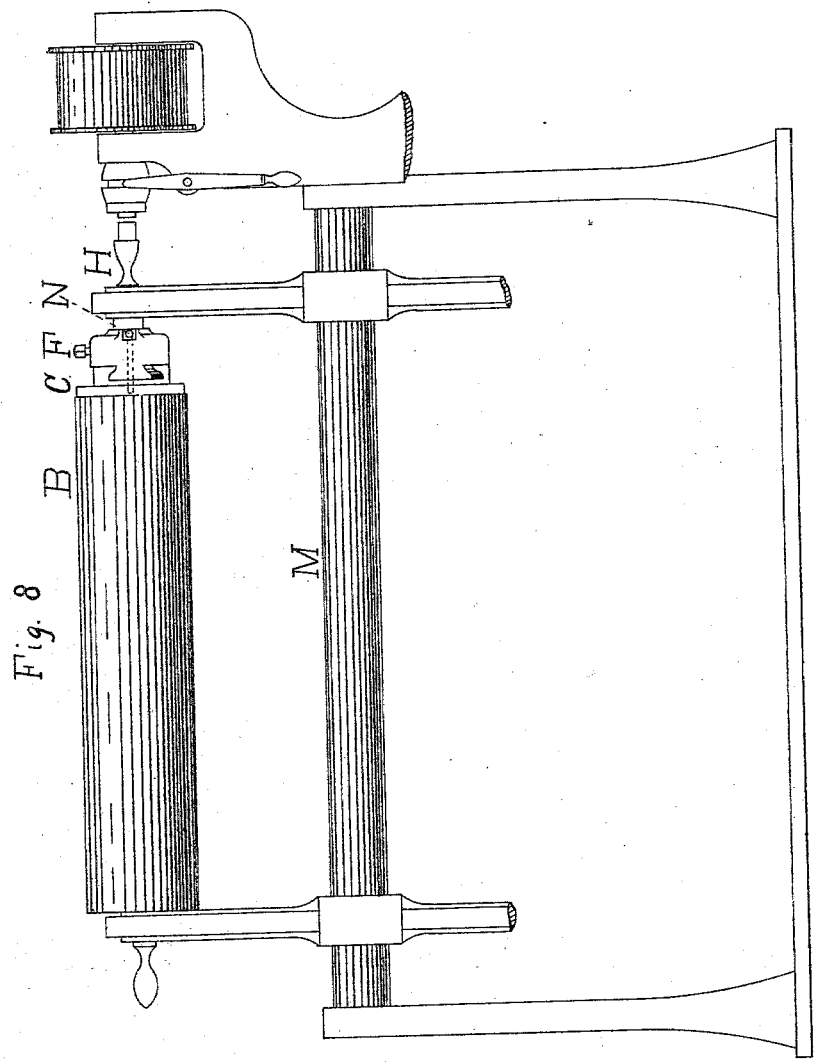

UNITED STATES PATENT OFFICE.

GIDEON GARCEAU, OF HOLYOKE, MASSACHUSETTS.

SPOOL-CLUTCH FOR PAPER-MACHINES.

SPECIFICATION forming part of Letters Patent No. 274,483, dated March 27, 1883.

Application filed April 5, 1882. (No model.)

*To all whom it may concern:*

Be it known that I, GIDEON GARCEAU, a subject of the Queen of Great Britain and Ireland, residing at Holyoke, in the county of Hampden and State of Massachusetts, have invented a new and useful Improvement in Spool-Clutches for Paper-Machines, of which the following is a specification, reference being had to the accompanying drawings, forming part thereof.

In clutches heretofore made the clutch was formed by the mutual resistance of the clutch-lugs on the spool-head and siding clutch-collar, and if the direction of the reel-shaft were changed, or if the reel-shaft ceased turning, the resistances ceased and the clutch was loosed. In my invention the respective clutch-lugs are held firmly together by means of a spring-bolt in the clutch-collar, the spur of which enters the spool-head.

Figure 1 of the drawings is a longitudinal central section of a portion of a paper-spool and the spool-head attached upon the reel-shaft A. B is the spool. C is the spool-head. D is the clutch-collar. E is broken section of the reel-shaft support. F is the set-screw fastening the clutch-collar upon the reel-shaft. T is the spring-bolt fastening the clutch, and N is the spur of the spring-bolt.

Fig. 2 is a plan of the spool-head, in which G G G G are lugs to be set into the end of the spool. H' H' are holes, through which enter the bolts fastening the head to the spool. H H are clutch-lugs upon the spool-head, and O O are holes, into which the spur N of the spring-bolt enters to fasten the clutch.

Fig. 3 is an elevation of the spool-head, showing the spur of the clutch-lugs H H.

Fig. 4 is a plan of the clutch-collar D, in which is shown V, an inclosure for the protection of the head of the spring-bolt T.

Fig. 5 is an elevation of the clutch-collar D, showing the spurs of the clutch-lugs P P and the spur N of the spring-bolt T.

Fig. 6 is a perspective view of my invention.

Fig. 7 is a plan of the spring-bolt T, of which K is a collar; L, a bushing or shoulder supporting the collar. M is the spring, and N a spur to enter the holes O O shown in Fig. 2.

Fig. 8 is a perspective view of a section of a paper-reel or machine for reeling paper at the delivery end of a paper-machine. The spool B is a hollow wooden cylinder, which is slid upon the spindle H, made removable for that purpose, and is fastened thereto by my invention.

As seen in Fig. 6, which is a perspective view of my invention, the reciprocal lug-clutches P and H are set together, completing the clutch. The spring-bolt T is seen in position, the spur N being set in the hole, (see Fig. 2,) and the reciprocal clutch-lugs are thereby fastened together, and the spool-head C and collar D can be separated only by drawing the bolt T.

When it is desired to remove the spool, the spring-bolt T can be drawn, the clutch-lugs separated, and the spool drawn from the shaft.

The superiority of my invention over other clutches heretofore used consists in holding the spool more firmly to the siding-collar, and in preventing the spool from becoming loosed from the siding-collar when, for any cause, the motion of the shaft H is reversed.

I claim as my invention—

In combination with a clutch for paper-spools, the reciprocal clutch-lugs and the spring-bolt, operated as and for the purpose set forth.

GIDEON GARCEAU.

Witnesses:
J. A. GARCEAU,
JOHN J. REARDON.